United States Patent
Manning et al.

(10) Patent No.: US 8,019,884 B2
(45) Date of Patent: Sep. 13, 2011

(54) PROXY CONTENT FOR SUBMITTING WEB SERVICE DATA IN THE USER'S SECURITY CONTEXT

(75) Inventors: David Franklin Manning, Victoria (CA); Michael Cain Mansell, Langford (CA); David Bradley Shapcott, Nanaimo (CA)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 11/965,163

(22) Filed: Dec. 27, 2007

(65) Prior Publication Data

US 2009/0172107 A1 Jul. 2, 2009

(51) Int. Cl.
  *G06F 15/16* (2006.01)
(52) U.S. Cl. ........................................ 709/231
(58) Field of Classification Search .................. 709/231
  See application file for complete search history.

(56) References Cited

U.S. PATENT DOCUMENTS

| | | |
|---|---|---|
| 2005/0228865 A1 | 10/2005 | Hirsch |
| 2006/0168221 A1* | 7/2006 | Juhls et al. ............ 709/225 |
| 2006/0234681 A1 | 10/2006 | Bibr et al. |
| 2006/0288228 A1 | 12/2006 | Botz et al. |
| 2008/0201344 A1* | 8/2008 | Levergood et al. ......... 707/100 |

FOREIGN PATENT DOCUMENTS

WO   2005099217   10/2005

OTHER PUBLICATIONS

O'Neill, Mapping Security to a Services-Oriented Architecture, FTP Online Security, Mar. 25, 2004, retrieved Aug. 2, 2007 http://www.ftponline.com/channels/security/ea/magazine/spring/departments/whiteboard/.

* cited by examiner

*Primary Examiner* — John Follansbee
*Assistant Examiner* — Alan S Chou
(74) *Attorney, Agent, or Firm* — Yee & Associates, P.C.; Justin M. Dillon (57) ABSTRACT

A computer implemented method provides a web service to a client. A document request identifying a web service on a web service server is sent from the client to an application server. The document request is stored at a first location. The application server then sends a proxy document request back to the client, wherein the proxy document request identifies the first location. The client then forwards the proxy document request to a web service. The web service generates a web service response, by resolving the proxy document request to the first location. The web service response is stored at a second location. A proxy web service response can then sent from the web service back to the client, wherein the proxy web service response identifies the second location. The client then forwards the proxy web service response to the application server. The application server generates a document response, by resolving the proxy web service response to the second location. The application server then forwards the document response to the client.

16 Claims, 6 Drawing Sheets

PROXY CONTENT FOR SUBMITTING WEB SERVICE DATA IN THE USER'S SECURITY CONTEXT

BACKGROUND OF THE INVENTION

1. Field of the Invention

The present invention relates generally computer implemented methods. More specifically, the present invention relates to computer implemented methods for submitting web service data within a user's security context by using proxy content.

2. Description of the Related Art

Web services have become increasingly popular with application developers. Using web services to implement a distributed computing model allows application-to-application communication. For example, one purchase-and-ordering application could communicate to an inventory application that specific items need to be reordered. Because of this level of application integration, Web services have grown in popularity and are beginning to improve business processes.

However, because web services are based on application-to-application communication, security of the application-to-application communication has become increasingly important. The application-to-application interactions enabled by web services create a situation where web service security to address topics, such as access control, authentication, data integrity, and privacy, is increasingly important.

Problems often arise when web services request information or services that require a security authorization from a client. Because the web service request was not received by the web service directly from the client, the web service must trust the assertions made by the forwarding application server that the application server is entitled to act on behalf of the client. Thus, retrieval of information from the web service is not made using the client's own security context. The security context is the client's stored passwords and security settings contained locally on the client's data processing system. Thus, any secured information required to access the requested web services must be originally included in the request from the client to application server which then makes the request for the web service.

SUMMARY OF THE INVENTION

A computer implemented method provides a web service to a client. A document request identifying requiring information from a web service to complete is sent from the client to an application server. The application server creates a web service request and stores it at a first unique location. The application server then sends a proxy web service request back to the client. The proxy web service request identifies the first unique location.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
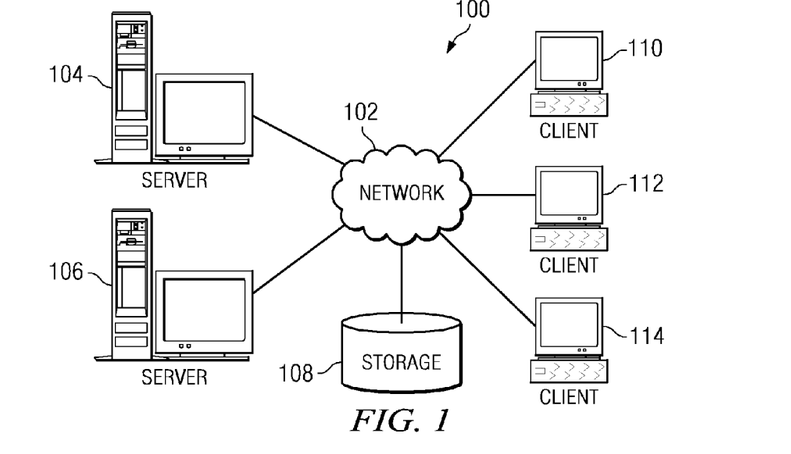
FIG. 1 is a pictorial representation of a network of data processing systems in which illustrative embodiments may be implemented.
Figure 2:
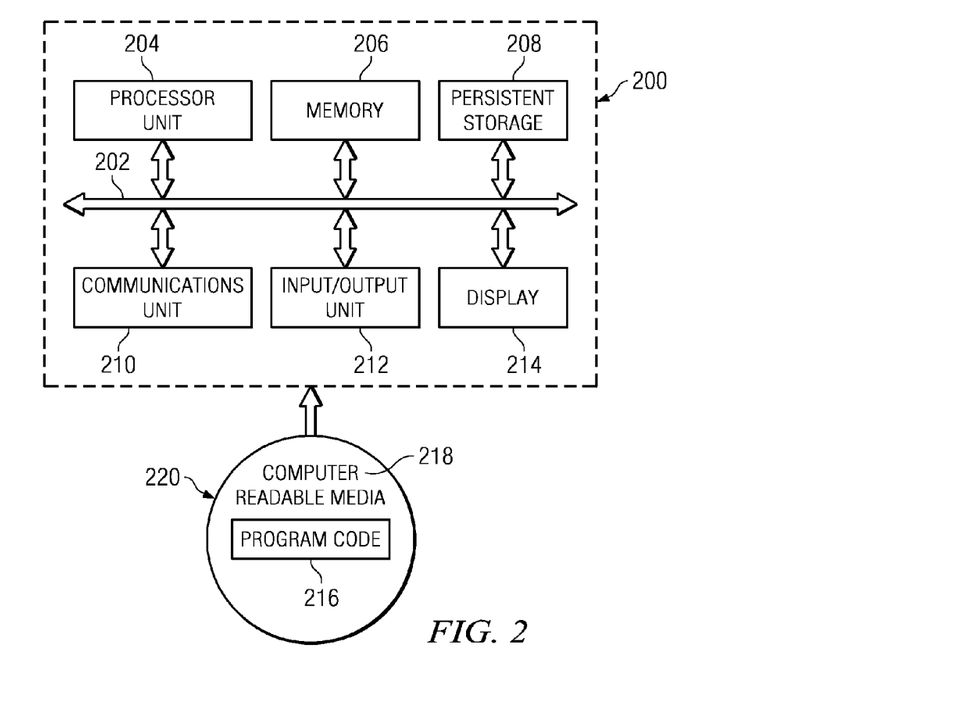
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The illustrative embodiments described herein describe a computer implemented method for providing a web service to a client. A document request requiring information from a web service to complete is sent from the client to an application server. The application server creates a web service request and stores it at a first unique location. The application server then sends a proxy web service request back to the client. The proxy web service request identifies the first unique location.

The client then forwards the proxy web service request to a web service. The web service generates a web service response by resolving the proxy web service request to the first location. The web service response is stored at a second location. A proxy web service response can then sent from the web service back to client, wherein the proxy web service response identifies the second location.

The client then forwards the proxy web service response to the application server. The application server generates a document response, by resolving the proxy web service response to the second location. The application server then forwards the document response to the client.

Figure 3:
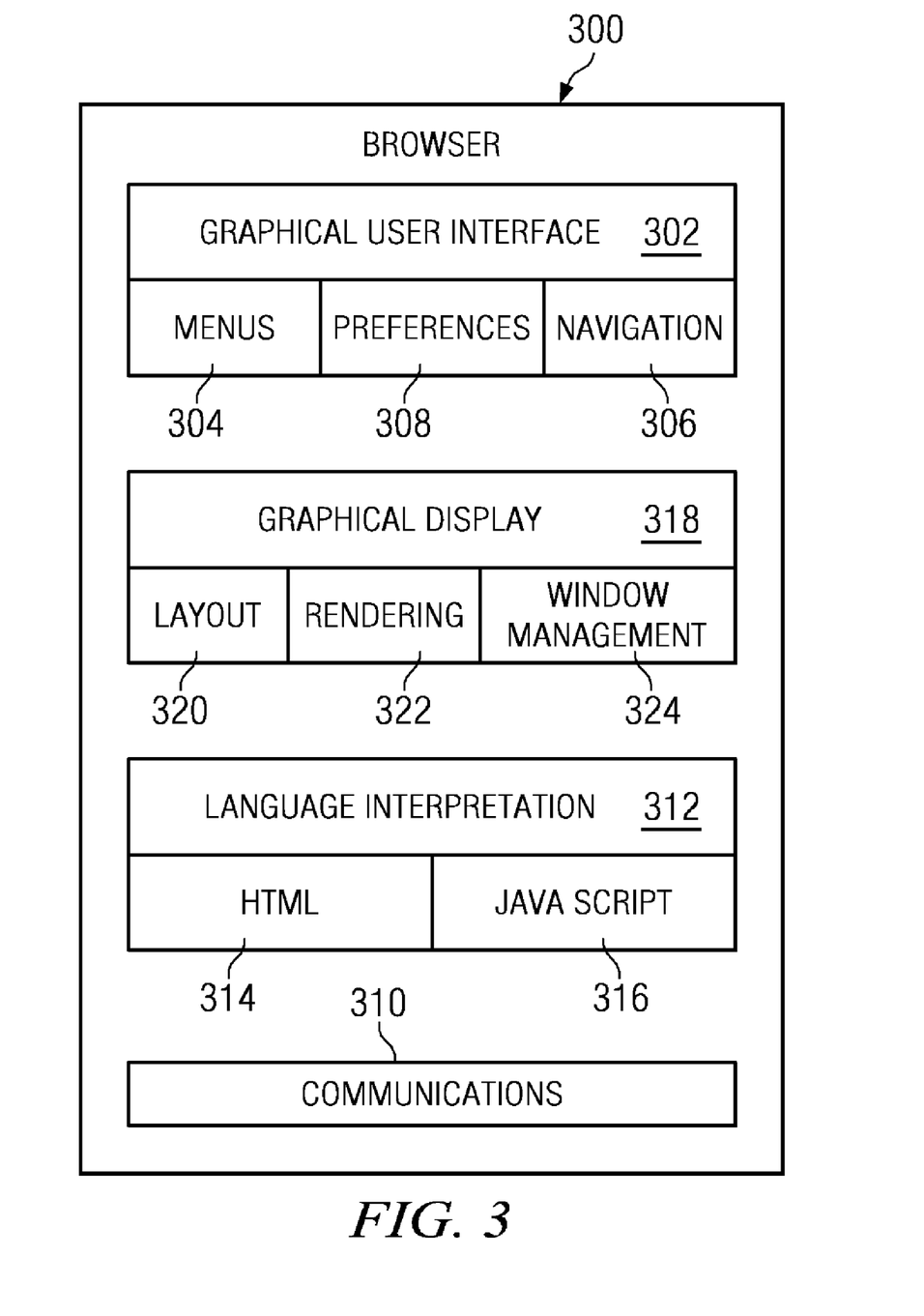
FIG. 3 is a block diagram of a browser program in accordance with an illustrative embodiment.

Turning next to FIG. 3, a block diagram of a browser program is depicted in accordance with an illustrative embodiment. A browser is an application used to navigate or view information or data in a distributed database, such as the Internet or the World Wide Web.

In this example, browser 300 includes graphical user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network, such as the Internet. Further, communications 310 is used to send or upload documents and resources onto a network. In the depicted example, communications 310 uses hypertext transfer protocol (HTTP). Other protocols may be used depending on the implementation. Documents that are received by browser 300 are processed by language interpretation 312, which includes HTML 314 and JavaScript 316. Language interpretation 312 will process a document for presentation on graphical display 318. In particular, HTML statements are processed by HTML 314 for presentation while JavaScript statements are processed by JavaScript unit 316.

Graphical display 318 includes layout 320, rendering 322, and window management 324. These units are involved in presenting web pages to a user based on results from language interpretation 312.

Browser 300 is presented as an example of a browser program in which illustrative embodiment may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Netscape Navigator or Microsoft Internet Explorer. Netscape Navigator is available from Netscape Communications Corporation while Microsoft Internet Explorer is available from Microsoft Corporation.

Figure 4:
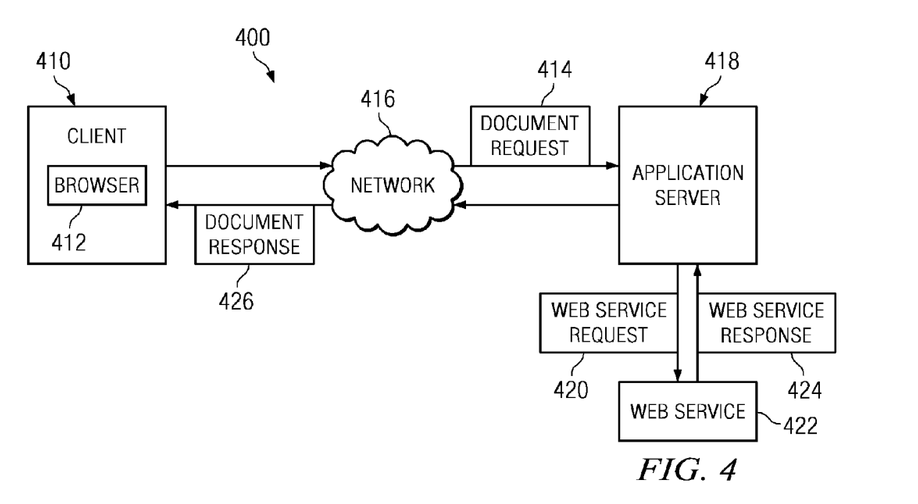
FIG. 4 is a diagram showing the data flow through various processing components for calling a web service according to the prior art.

Referring now to FIG. 4, a diagram showing the data flow through various processing components for calling a web service is shown according to the prior art.

Client 410 executes browser 412. Client 410 can be client 110, 112, or 114 of FIG. 1. Browser 412 can be browser 300 of FIG. 3. Browser 412 sends document request 414 through network 416 to application server 418. Network 416 can be network 102 of FIG. 1.

Document request 414 is a request for a document containing information or services requiring information from a web service to complete the information or services not being contained on application server 418. Document request 414 may be a request that requires a security authorization from client 410 in order to access the information or services.

Responsive to receiving document request 414, application server 418 sends web service request 420 to web service 422. Web service request 420 is a request to web service 422 to provide information or services not contained within a document located on application server 418. Web service 422 is a software system designed to support interoperable machine to machine interaction over a network. Web service 422 can be any software system that application server 418 is capable of communicating with, which can provide information or services to application server 418.

Web service 422 sends web service response 424 to application server 418. Web service response 424 includes information or services not contained within a document located on application server 418, which was requested by web service request 420. Application server 418 formats web service response 424 into document response 426, and then sends document response 426 to browser 412, where document response 426 is displayed within browser 412 at client 410.

However, the described implementation suffers from several security flaws. If the requested information or services require a security authorization from client 410, web service 422 may be unable to complete the web service request 420. Because web service request 420 was received by web service 422 from application server 418, and not directly from client 410, web service 422 must be assured that application server 418 is authorized to make the web service request 420 for information or services on client 410's behalf.

Figure 5:
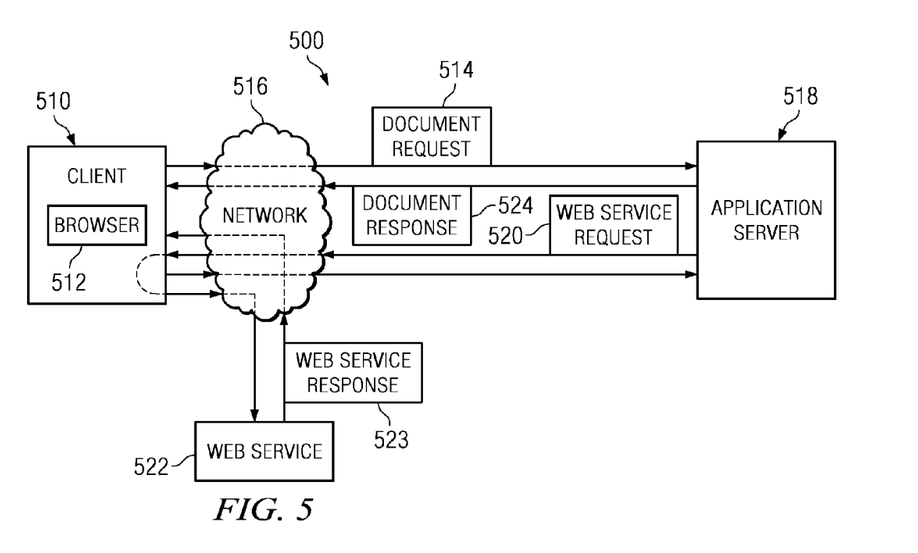
FIG. 5 is a diagram showing a data flow through various processing components for calling a web service according to the prior art.

Referring now to FIG. 5, a diagram showing a data flow through various processing components for calling a web service is shown according to the prior art. The data flow of FIG. 5 is a prior art attempted method to overcome the deficiencies of the solution of FIG. 4.

Client 510 executes browser 512. Client 510 can be client 110, 112, or 114 of FIG. 1. Browser 512 can be browser 300 of FIG. 3. Browser 512 sends document request 514 through network 516 to application server 518. Network 516 can be network 102 of FIG. 1.

Document request 514 is a request for a document containing information or services not contained within a document located on application server 518. Document request 514 may be a request that requires a security authorization from client 510 in order to access the information or services.

Responsive to receiving document request 514, application server 518 sends web service request 520 to browser 512. Browser 512 then forwards web service request 520 to web service 522. Web service request 520 is a request to web service 522 to provide information or services not contained within a document located on application server 518. Web service 522 is a software system designed to support interoperable machine to machine interaction over a network. Web service 522 can be any software system that application server 518 is capable of communicating with, which can provide information or services to application server 518.

Web service 522 sends web service response 523 to browser 512. Browser 512 then forwards web service response 522 to application server 518. Web service response 522 includes information or services not contained within a document located on application server 518, which was requested by web service request 520. Application server 518 formats web service response 523 into document response 524, and then sends document response 524 to browser 512, where document response 524 is displayed within browser 512 at client 510.

The architecture described in FIG. 5 allows for the submission of any security authorization to be forwarded directly from client 510 to web service 522 using client 510's security context. However, the architecture described in FIG. 5 has two significant shortcomings.

First, the size of document request 514 and document response 524 is severely limited. The JavaScript engines in most web browsers can only process a maximum string size of between 2exp16 or 2exp32 bytes. This limits the size of both the request and the response that can be processed. Many commercial applications need to transact significant amounts of data with their associated web services. In some applications, multi-megabyte transactions are not uncommon. The limited string size of the JavaScript engines in most web browsers cannot process such a large request.

Second, the latency imposed by the multiple network communications is often unacceptable. Using the architecture described in FIG. 5 to query a single web service causes the entire request to be transmitted twice. The request is first transmitted from the service to the user's browser. The request is then again transmitted from the user's browser to the web service. Furthermore, the architecture described in FIG. 5 causes the entire response to be transmitted twice. The response is first transmitted from the web service to the browser. The response is then again transmitted from the browser to the application server. Therefore, the time to process the request often becomes unacceptably long. These latency problems are especially prevalent with large transactions when the user utilizes a slower network connection.

However, the described implementation suffers from several security flaws. If the requested information or services require a security authorization from client 510, web service 522 may be unable to complete the web service request 520. Because web service request 520 was received by web service 522 from application server 518, and not directly from client 510, any secured information required to access the requested information or services must be originally included in the request from browser 512 to application server 518. Furthermore, web service 522 must be assured that application server 518 is authorized to make the web service request 520 for information or services on client 510's behalf.

Figure 6:
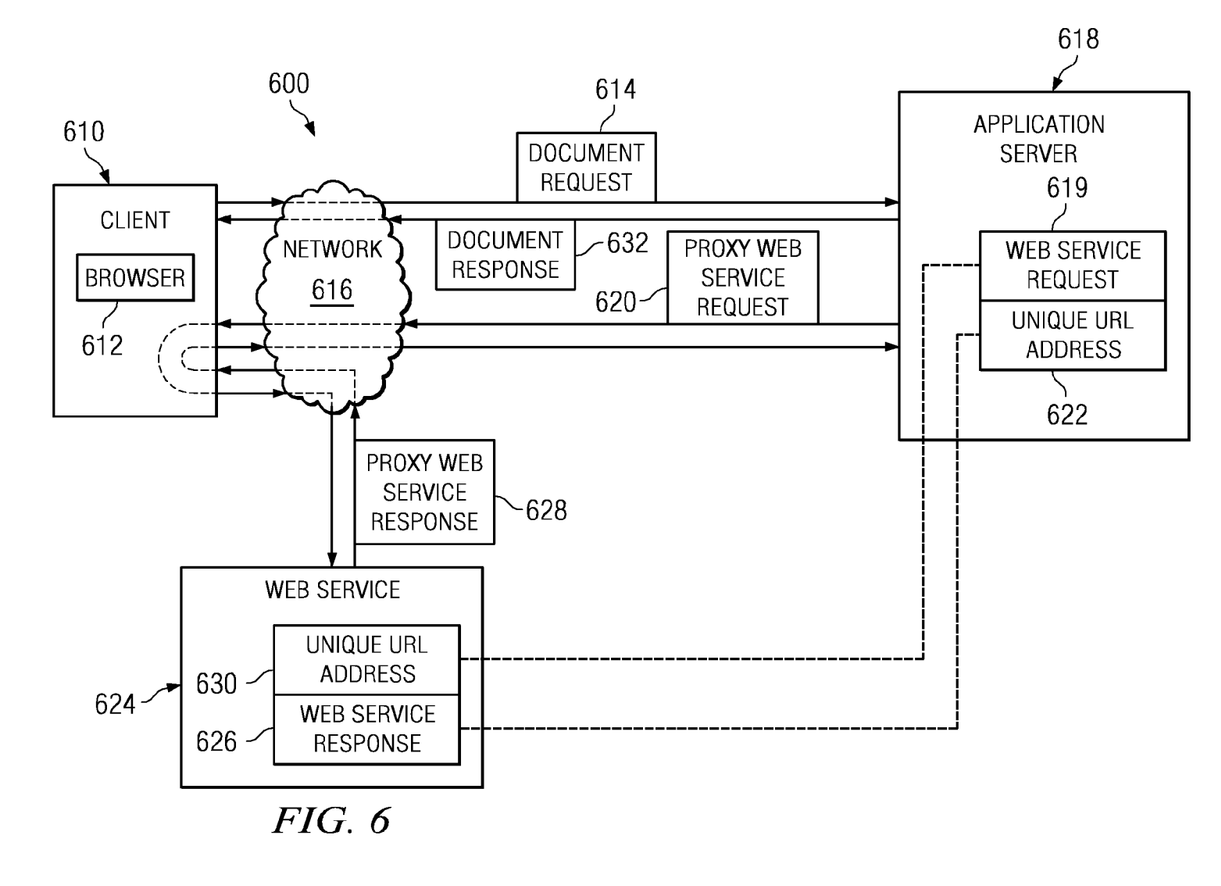
FIG. 6 is a diagram showing a data flow through various processing components for calling a web service according to an illustrative embodiment.

Referring now to FIG. 6, a diagram showing a data flow through various processing components for calling a web service is shown according to an illustrative embodiment. The data flow of FIG. 6 overcomes the security deficiencies of the prior art solution of FIG. 4, as well as the network latency issues prevalent in the prior art solution of FIG. 5.

Client 610 executes browser 612. Client 610 can be client 110, 112, or 114 of FIG. 1. Browser 612 can be browser 300 of FIG. 3. Browser 612 sends document request 614 through network 616 to application server 618. Network 616 can be network 102 of FIG. 1.

Document request 614 is a request for a document containing information or services requiring information from a web service to complete the web service not being located on application server 618. Document request 614 may be a request that requires a security authorization from client 610 in order to access the information or services.

Responsive to receiving document request 614, application server 618 creates and stores web service request 619. Application server 618 sends proxy web service request 620 to browser 612 of client 610. Web service request 619 is saved on application server 618 under a unique URL address 622. Proxy web service request 620 is an extremely small XML service request containing a single external entity reference. In an illustrative embodiment, proxy web service request 620 is less than 1000 bytes. Proxy web service request 620 is a source URL which points to the unique URL address 622 stored on the application server 618.

Responsive to receiving proxy web service request 620, browser 612 forwards the proxy web service request 620 to web service 624. Web service 624 is a software system designed to support interoperable machine to machine interaction over a network. Web service 624 can be any software system that application server 618 is capable of communicating with, which can provide information or services to application server 618. Because web service 624 receives proxy web service request 620 directly from client 610, and not forwarded from application server 618. The submission of the proxy web service request 620 is in the user's own security context. Thus, like the solution proposed in FIG. 6 above, the architecture illustrated herein allows for the submission of any security authorization to be forwarded directly from client 610 to web service 624 using client 610's security context.

When web service 624 parses proxy web service request 620, the external entity reference contained within proxy web service request 620 is resolved to unique URL address 622. Web service 624 retrieves web service request 619 directly from application server 618. Web service 624 then generates web service response 626. Web service response 626 includes the web service requested by document request 614.

Web service 624 stores web service response 626 and sends proxy web service response 628 to browser 612 of client 610. Web service response 626 is saved on web service 624 under a second unique URL address 630. Proxy web service response 628 is an extremely small XML service request containing a single external entity reference. In an illustrative embodiment, proxy web service response 628 is less than 1000 bytes. The external entity reference is a source URL which points to the second unique URL address 630 stored on the web service 624.

Responsive to receiving proxy web service response 628 from web service 624, browser 612 of client 610 forwards proxy web service response 628 to application server 618. When application server 618 parses proxy web service response 628, the external entity reference contained within proxy web service response 628 is resolved to second unique URL address 630. Application server 618 retrieves web service response 626 directly from the Web service 624. Application server 618 then generates document response 632. Document response 632 includes web service response 626 that was requested by document request 614. Application server 618 then sends document response 632 to browser 612, where document response 632 is displayed within browser 612 at client 610.

Figure 7:
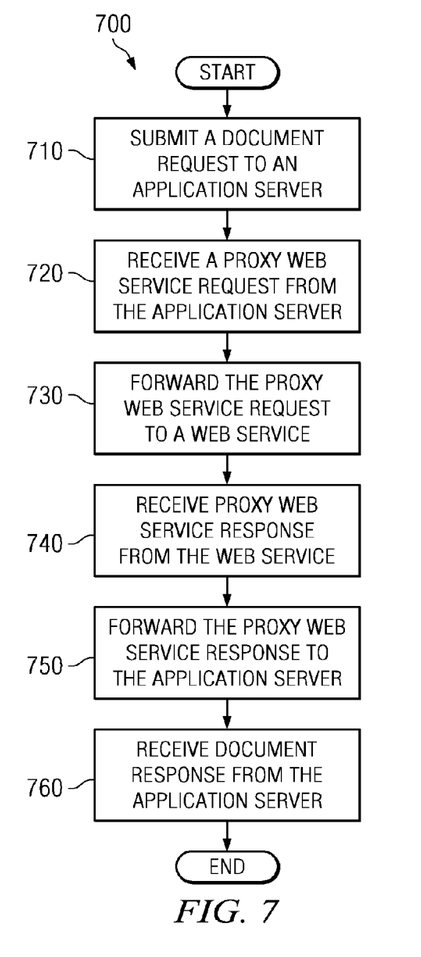
FIG. 7 is a flowchart of the processing steps for calling a web service according to an illustrative embodiment.

Referring now to FIG. 7, a flowchart of the processing steps for calling a web service is shown according to an illustrative embodiment. Process 700 is a software process, executing on a software component, such as browser 612 of FIG. 6.

Process 700 begins by submitting a document request, such as document request 614 of FIG. 6, to an application server, such as application server 618 of FIG. 6 (step 710). The document request is a request for a document containing information or services not contained on the application server. The document request may be a request that requires a security authorization from a client, such as client 610 of FIG. 6, in order to access the information or services.

Responsive to submitting the document request, process 700 receives a proxy web service request from the application server (step 720). The proxy web service request is an extremely small XML service request containing a single external entity reference. In an illustrative embodiment, the proxy web service request is less than 1000 bytes. The reference is a source URL which points to a unique URL address on the application server. The web service request is saved on the application server at that unique URL address.

Responsive to receiving a proxy web service request, process 700 forwards the proxy web service request to a web service (step 730). The web service is a software system designed to support interoperable machine to machine interaction over a network. The web service resolves the proxy web service request with the application server, and generates a web service response, which is stored at the web service under a second unique URL address.

Process 700 receives a proxy web service response from the web service (step 740). The proxy web service response is an extremely small XML service request containing a single external entity reference. In an illustrative embodiment, the proxy web service response is less than 1000 bytes. The external entity reference is a source URL which points to the second unique URL address stored on the web service.

Process 700 then forwards the proxy web service response to the application server (step 750). The application server resolves the proxy web service response with the web service and generates a document response.

Process 700 then receives the document response from the application server (step 760), with the process terminating thereafter. The document response includes the web service response that was retrieved from the web service.

Figure 8:
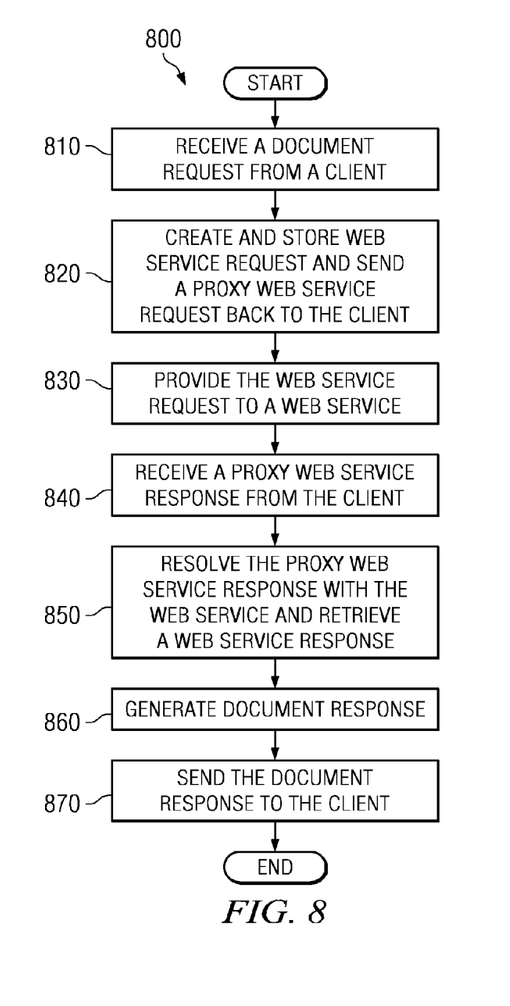
FIG. 8 is a flowchart of the processing steps for calling a web service according to an illustrative embodiment.

Referring now to FIG. 8, a flowchart of the processing steps for calling a web service is shown according to an illustrative embodiment. Process 800 is a software process, executing on a software component, such as application server 618 of FIG. 6.

Process 800 begins by receiving a document request, such as document request 614 of FIG. 6, from a client, such as client 610 of FIG. 6 (step 810). The document request requires information from a web service to complete the web service not being located on the application server executing process 800. The document request may be a request that requires a security authorization from a client in order to access the information or services.

Responsive to receiving the document request, process 800 creates and stores a web service request and sends a proxy web service request back to the client (step 820). The web service request is saved on the application server under a unique URL address. The proxy web service request is an extremely small XML service request containing a single external entity reference. In an illustrative embodiment, the proxy web service request is less than 1000 bytes. The reference is a source URL which points to the unique URL address stored on the application server.

Process 800 then provides web service request to a web service (step 830). The web service has previously received the proxy web service request from the client. The web service, when parsing the proxy web service request, resolves the single external entity reference to the unique URL address stored at the application server. Process 800 provides the web service request to the web service responsive to the resolution of the single external entity reference to the unique URL address.

Process 800 then receives a proxy web service response from the client (step 840). The proxy web service response is an extremely small XML service request containing a single external entity reference. In an illustrative embodiment, the proxy web service response is less than 1000 bytes. The external entity reference is a source URL which points to the second unique URL address stored on the web service.

Process 800 resolves the proxy web service response with the web service and retrieves a web service response (step 850). Process 800 parses the proxy web service response, the external entity reference contained within proxy web service response is resolved to a second unique URL address at the web service which contains the web service response. Process 800 therefore retrieves the web service response directly from the web service.

Process 800 generates document response (step 860). The document response includes the web service requested by the original document request. Process 800 then sends the document response to the client (step 870), with the process terminating thereafter.

Figure 9:
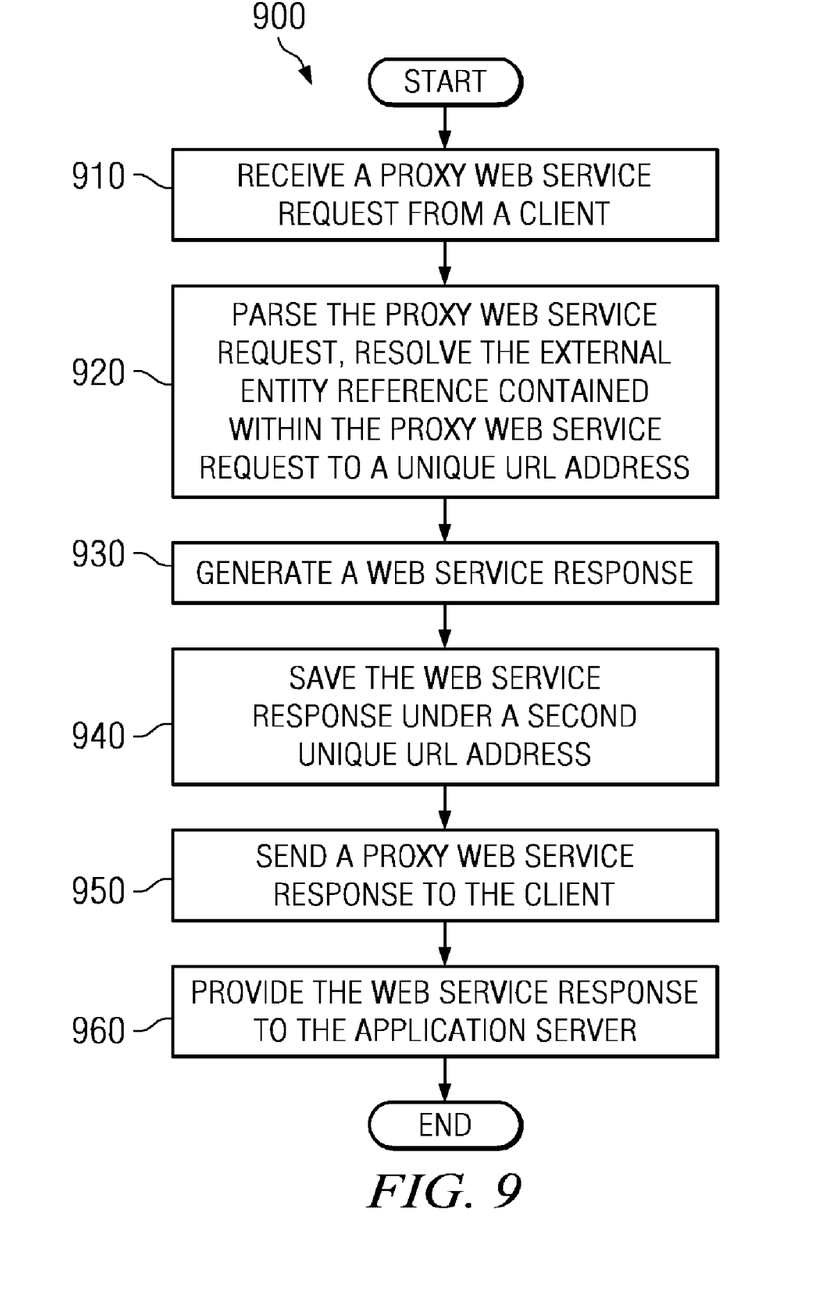
FIG. 9 is a flowchart of the processing steps for calling a web service according to an illustrative embodiment.

Referring now to FIG. 9, a flowchart of the processing steps for calling a web service is shown according to an illustrative embodiment. Process 900 is a software process, executing on a software component, such as web service 624 of FIG. 6.

Process 900 begins by receiving a proxy web service request, such as proxy web service request 620 of FIG. 6, from a client, such as client 610 of FIG. 6 (step 910). The proxy web service request is an extremely small XML service request containing a single external entity reference. In an illustrative embodiment, the proxy web service request is less than 1000 bytes. The reference is a source URL which points to a unique URL address on an application server. A web service request created, and is saved on the application server at the unique URL address.

Responsive to receiving the proxy web service request, process 900 parses the proxy web service request, resolving the external entity reference contained within a proxy web service request to the unique URL address (step 920). Because process 900 receives the proxy web service request directly from the client, and not from an application server, the submission of the proxy web service request is in the user's own security context. Thus, the submission of any security authorization is forwarded directly from the client to process 900 using the client's security context.

Process 900 then generates a web service response (step 930). The web service response includes the web service requested by document request. Process 900 saves the web service response under a second unique URL address (step 940).

Process 900 then sends a proxy web service response to the client (step 950). The proxy web service response is an extremely small XML service request containing a single external entity reference. In an illustrative embodiment, proxy web service response is less than 1000 bytes. The external entity reference is a source URL which points to the second unique URL address containing the web service response.

Process 900 then provides the web service response to the application server (step 960), with the process terminating thereafter. The application server has previously received the proxy web service response from the client. The application server, when parsing the proxy web service response, resolves the single external entity reference to the unique URL address stored at the web service. Process 900 provides the web service response to the application server responsive to the resolution of the single external entity reference of the proxy web service response to the unique URL address.

Thus, the illustrative embodiments described herein provide a computer implemented method for providing a web service to a client. A document request identifying a web service on a web service server is sent from the client to an application server. The document request is stored at a first location. The application server then sends a proxy document request back to the client, wherein the proxy document request identifies the first location.

The client then forwards the proxy document request to a web service. The web service generates a web service response, by resolving the proxy document request to the first location. The web service response is stored at a second location. A proxy web service response can then be sent from the web service back to the client, wherein the proxy web service response identifies the second location.

The client then forwards the proxy web service response to the application server. The application server generates a document response, by resolving the proxy web service response to the second location. The application server then forwards the document response to the client.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing a web service comprising:
    receiving a document request from a client, the document request identifying a web service on a web service server;
    storing the document request at a first location;
    sending a proxy document request to the client, wherein the proxy document request comprises a first external entity reference, the first external entity reference identifying the first location;
    forwarding the document request to the web service in response to the web service resolving the first external entity reference to the first location;
    receiving a proxy web service response from the client, wherein the proxy web service response comprises a second external entity reference, the second external entity reference identifying the second location;
    responsive to receiving the proxy web service response, identifying a web service response from the second location, wherein the step of identifying the web service response from the second location comprises resolving the second external entity reference to the second location;
    generating a document response, wherein the document response incorporates the web service response; and
    forwarding the document response to the client.

2. The computer implemented method of claim 1, wherein the document request is received at an application server, and wherein the first location is at the application server.

3. The computer implemented method of claim 1, wherein the second location is at the web service server.

4. The computer implemented method of claim 1, wherein the step of sending the proxy document request to the client further comprises sending the proxy document request, wherein the proxy document request is less than 1000 bytes, and wherein the step of receiving the proxy web service response from the client further comprises receiving the proxy web service response, wherein the proxy web service response is less than 1000 bytes.

5. A computer implemented method for providing a web service comprising:
    sending a document request to an application server, the document request identifying a web service on a web service server;
    receiving a proxy document request from the application server, wherein the proxy document request comprises a first external entity reference, the first external entity reference identifying a first location, wherein the document request is stored at the first location; and
    forwarding the proxy document request to the web service server;
    receiving a proxy web service response from the web service server, wherein the proxy web service response comprises a second external entity reference, the second external entity reference identifying the second location;
    responsive to receiving the proxy web service response from the web service server, forwarding the proxy web service response to the application server; and
    receiving a document response from the application server.

6. The computer implemented method of claim 5, wherein the first location is at the application server.

7. The computer implemented method of claim 5, further comprising:
    receiving the proxy web service response from the web service server, wherein the proxy web service response identifies the second location, and wherein the web service response is stored at the second location; and
    receiving a document response from the application server, wherein the document response incorporates the web service response.

8. The computer implemented method of claim 7, wherein the second location is at the web service server.

9. The computer implemented method of claim 5, wherein the step of receiving the proxy document request comprises receiving the proxy document request, wherein the proxy document request is less than 1000 bytes.

10. The computer implemented method of claim 7, wherein the step of forwarding the proxy web service response further comprises forwarding the proxy web service response, wherein the proxy web service response is less than 1000 bytes.

11. A computer implemented method for providing a web service comprising:
- receiving a proxy document request from client, wherein the proxy document request comprises a first external entity reference, the first external entity reference identifying the first location;
- responsive to receiving the proxy document request, identifying a document request from the first location, wherein the step of identifying a document request from the first location comprises resolving the first external entity reference to the second location;
- responsive to identifying document request from the first location, generating a web service response, wherein the web service response comprises a second external entity reference, the second external entity reference identifying the second location;
- responsive to generating a web service response, storing the web service response at a second location;
- forwarding a proxy web service response to the client, wherein the proxy web service response identifies the second location; and
- forwarding the web service response to the application server in response to the application server resolving the second external entity reference to the second location.

12. The computer implemented method of claim 11, wherein the second location is at the web service server.

13. The computer implemented method of claim 11, wherein the step of receiving the proxy document request comprises receiving the proxy document request, wherein the proxy document request is less than 1000 bytes.

14. The computer implemented method of claim 11, wherein the step of forwarding the proxy web service response further comprises forwarding the proxy web service response, wherein the proxy web service response is less than 1000 bytes.

15. A computer storage device having a computer useable code encoded thereon for providing a web service, the computer storage device comprising:
- computer usable code for receiving a document request from a client at an application server, the document request identifying a web service on a web service server;
- computer usable code for storing the document request at a first location;
- computer usable code for sending a proxy document request to the client, wherein the proxy document request comprises a first external entity reference, the first external entity reference identifying the first location;
- computer usable code for forwarding the document request to the web service in response to the web service resolving the first external entity reference to the first location;
- computer usable code for receiving a proxy web service response from the client, wherein the proxy web service response comprises a second external entity reference, the second external entity reference identifying the second location;
- computer usable code, responsive to receiving the proxy web service response, for identifying a web service response at the second location, wherein the step of identifying the web service response from the second location comprises resolving the second external entity reference to the second location;
- computer usable code for, responsive to identifying the web service response at the second location, for generating a document response, wherein the document response incorporates the web service response; and
- computer usable code, responsive to generating a document response, for forwarding the document response to the client.

16. A data processing system comprising:
- a bus;
- a communications unit connected to the bus;
- a storage device connected to the bus, wherein the storage device includes computer usable program code; and
- a processor unit connected to the bus, wherein the processor unit executes the computer usable program code to receive a document request from a client at an application server, the document request identifying a web service on a web service server, to store the document request at a first location, to send a proxy document request to the client, wherein the proxy document request comprises a first external entity reference, the first external entity reference identifying the first location, to forward the document request to the web service in response to the web service resolving the first external entity reference to the first location, to receive a proxy web service response from the client, wherein the proxy web service response comprises a second external entity reference, the second external entity reference identifying the second location, responsive to receiving the proxy web service response, to identify a web service response at the second location, wherein the step of identifying the web service response from the second location comprises resolving the second external entity reference to the second location, responsive to identifying the web service response at the second location, to generate a document response, wherein the document response incorporates the web service response, and, responsive to generating a document response, to forward the document response to the client.

* * * * *